Aug. 10, 1943.  C. B. STRAUCH  2,326,720
PNEUMATIC PROTECTOR FOR AUTOMOBILES
Filed Dec. 19, 1939    2 Sheets-Sheet 1
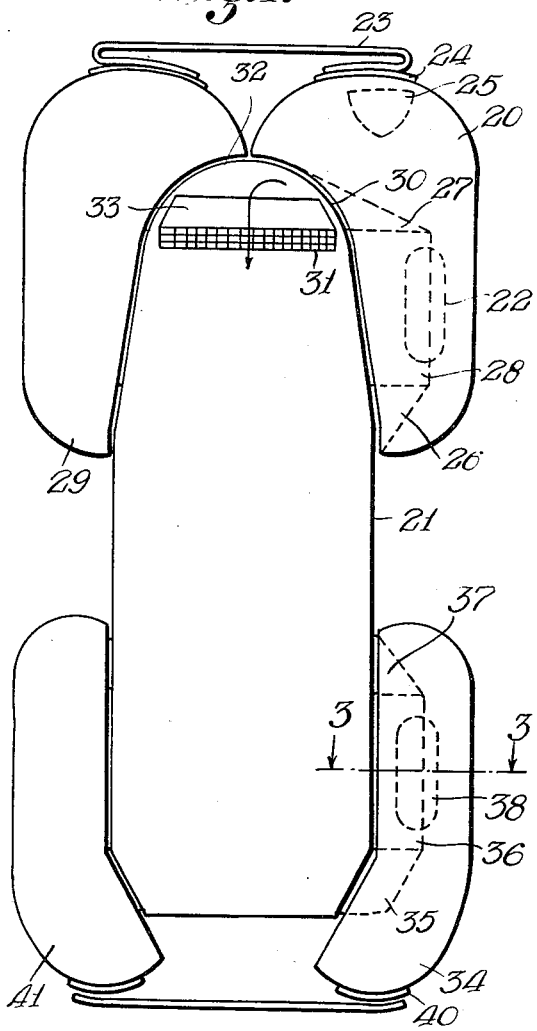
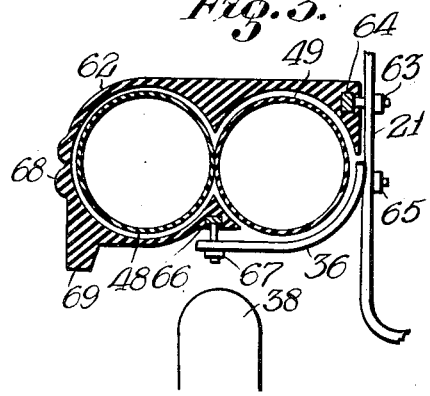
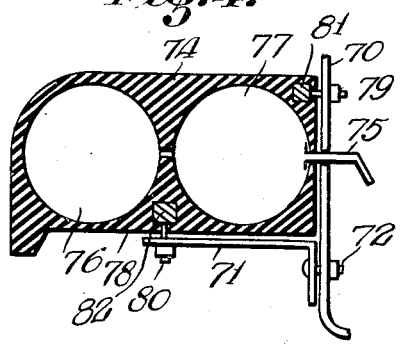
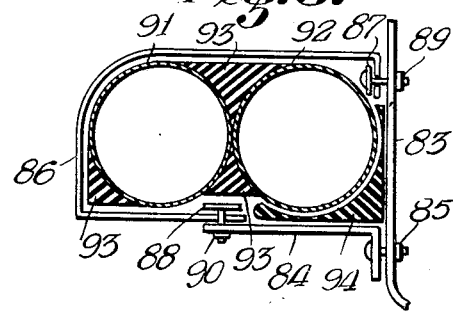
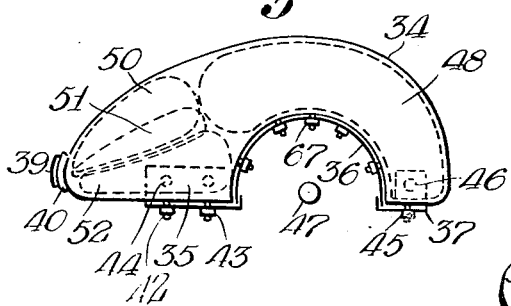
Inventor:
Clauss Burkart Strauch

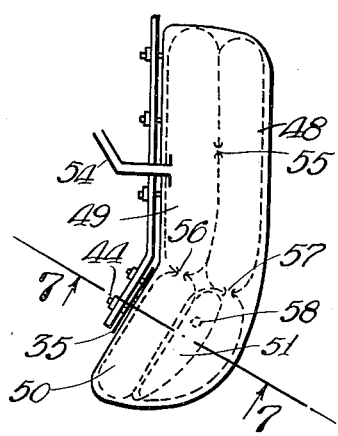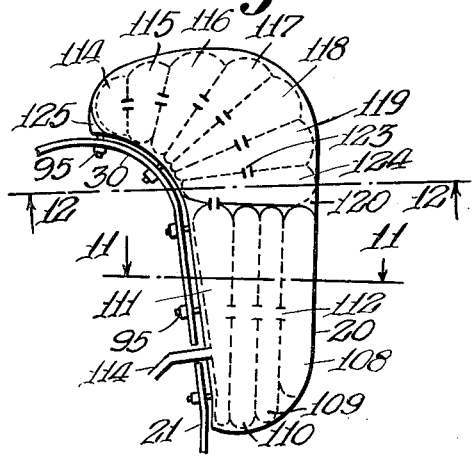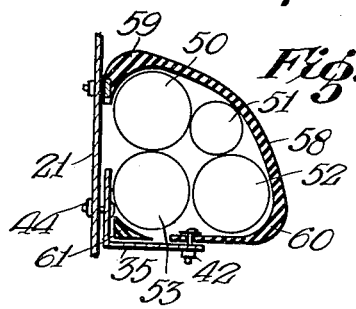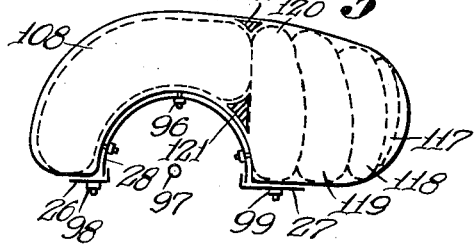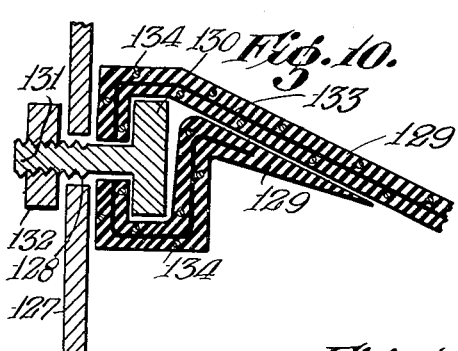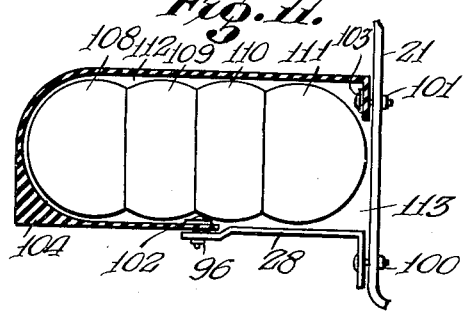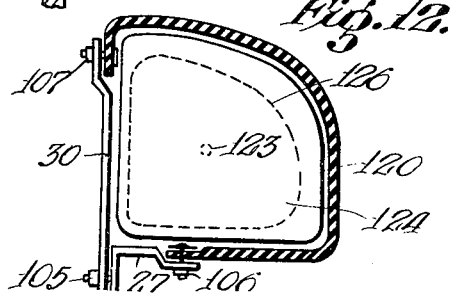

Patented Aug. 10, 1943

2,326,720

UNITED STATES PATENT OFFICE 2,326,720

PNEUMATIC PROTECTOR FOR AUTOMOBILES

Clauss Burkart Strauch, Milwaukee, Wis.

Application December 19, 1939, Serial No. 309,990

3 Claims. (Cl. 280—152)

This invention relates to improvements in automobiles and more particularly to improved constructions of pneumatic fenders adapted to lessen the dangers of automobile accidents.

This case is a continuation in part of my co-pending applications Serial #260,672, filed March 9, 1939, now U. S. Patent #2,218,690 issued October 22, 1940, and Serial #297,545, filed October 2, 1939, now U. S. Patent No. 2,305,205, issued Dec. 15, 1942.

Heretofore, automobiles have been provided with fenders, constructed merely for streamlining and decorative purposes and against the dirt thrown from the wheels. They consist of thin walled, decorated metal bodies, lately of large dimensions, which are easily marred and crushed by any impact, leading to repeated and costly repairs, without offering any protection in collisions.

As an improvement, pneumatic fenders have been proposed.

It is well known that hollow bodies made of elastic and flexible material such as rubber will tend to assume rounded and spherical shapes when inflated under pressure. The pneumatic fenders, which have been proposed, consist, therefore, of relatively heavy walls containing a relatively small air space, inflated at low pressure to obviate change of shape. Such pneumatic fenders protect in collisions chiefly by the elasticity of the heavy walls of the casings, and do not substantially utilize the essential resiliency of compressed air, in such degree as in automobile tires.

It is my invention, as described in the aforesaid applications, to construct pneumatic cushions in the shape of protruding fenders; forming integral, detachable parts of the car; the cushions consisting of relatively thin outer casings composed of fabric, rubber and optionally wires; each carrying an innertube held and supported by the body of the car and special supports; filled with air under pressure and inflating the cushions to firm, but yielding, resilient, elastic protectors, which term includes pneumatic fenders acting at the same time as bumpers by their protruding outer poles respectively as resilient bases for bumper rods attached to these poles.

It is my present invention to provide additional methods for holding my pneumatic protectors in the desired shape when inflated, especially such protectors which are to be inflated by higher air pressure; to provide means for constructing non-bulging pneumatic fenders or protectors in any form necessary for practical, technical or artistical purposes, and not changing shape on changed pressure; to permit construction of pneumatic fenders which react chiefly by the resiliency of the enclosed air; to provide resilient pneumatic fenders which may be inflated by any pressure without bulging but will keep the desired shape by an inherent construction without undue distortions or strains; to provide pressure inflated bodies, not increasing in size with increasing pressure, and not limited to circular, tubular, spherical or convex shapes; and to permit construction of automobiles with streamlined protectors serving as mudguards, windbreakers and bumpers, cushioning at the same time by pneumatic, pressure inflated resiliency all surfaces liable to be involved in accidents, protecting car and occupants as well as outside persons or objects colliding with the car, without deducting, however, in any manner and at any degree of inflation from the artistic and constructional appearance of the car.

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Figure 1 is a plan view of an automobile applied with protectors according to my invention, showing in its right half, representing the right half of the automobile, in interrupted lines the projections of the outlines of the headlight body, of the wheels and of the metallic brackets serving as a support for the protectors, omitting details of the car body. A part of the hood is broken away to show the radiator and the air inlet.

Figure 2 is a side elevation of the right rear fender showing in interrupted lines the projection of the innertube aggregate and also parts of the lower support brackets. The wheel has been detached.

Figure 3 is a vertical sectional view on line 3—3 of Figure 1, and Figures 4 and 5 are modifications thereof.

Figure 6 represents a plan view of the right rear protector showing in interrupted lines the projection of the innertube aggregate. Figure 7 is a vertical sectional view on line 7—7 of Figure 6.

Figure 8 represents a plan view of the right front protector showing in interrupted lines the projection of the innertube aggregate, and Figure 9 represents a side elevation of the same protector, showing in interrupted lines the innertubes projected, after the wheel has been removed.

Figure 10 represents an enlarged, detailed, vertical sectional view of the attachment of the fenders and of a preferred form of the construction of the casing.

Figure 11 is a vertical sectional view on line 11—11 of Figure 8.

Figure 12 is a vertical sectional view of on line 12—12 of Figure 8.

In Figure 1, 20 is the right front pneumatic fender or protector as defined before, fastened to the body or frame 21 of the car, serving as mudguard for the wheel 22 and also by its anterior pole as a resilient support for an optional metallic bumper rod 23 which is held by a flexible baseplate 23, representing an added enforcement to the casing of the protector. The front pole of the protector may contain a depression adapted to hold the headlamp 25 in the same manner as in metallic fenders.

In its preferred form the protector 20 consists of a casing, similar in purpose and construction to the casing of an automobile tire, with the differences described below, and an innertube of a novel structure. The casing, however, is cut away on the parts not subject to actual contact with external objects, effecting a large window in the casing. The free edges of the window are secured by means of a bead to the body 21 of the car, to the rear bracket 26, the front bracket 27 and an arched support 28, forming an all enclosed cavity. In Figure 1, I prefer to show the protector 20 converging towards the median line, contacting the left front protector 29, both secured and backed in their anterior poles by a curved metallic bracket 30, extending forward from the body or frame 21 of the automobile as indicated by the position of the radiator 31. The arched bracket 30 is open towards the street, which opening serves as an air inlet 32, aided by a shelf 33 extending from the radiator 31 downward and forward in an angle of 45° to increase the intake of the airflow indicated by the arrow.

34 is the right rear protector fastened to the car 21 and to the supports 35, 36 and 37, serving as mudguard for the wheel 38 and as a resilient base to the optional metallic bumper rod 39, held by the baseplate 40. The protector 24 is constructed and suspended in similar manner as described above for the front protector 20. The rear poles of the protector 34 and the corresponding protector 41 do not meet in the example shown to facilitate access to the luggage compartment and other rear parts of the car.

In Figure 2, 34 is the right rear protector. The screws 42 and 43 hold the edge of the casing window to the rear bracket 35 which itself is fastened to the body of the car by screws such as 44. The front bracket 37 holds the bead of the casing by the screw 45 and is itself fastened to the body by the screw 46. 47 represents the axle of the wheel 38, which has been detached. Screws such as 67 secure the casing to the arch 36.

The all enclosed cavity formed by the body 21 of the car, the brackets 35, 36 and 37 and the casing of the protector 34 is inflated by an aggregate of six innertubes shown in the Figures 2, 3, 6 and 7, while Figs. 4 and 5 show modifications.

In these figures, 48 and 49 are two curved tubes, each closed on both ends by a segment of a sphere or other rounded body. 50, 51, 52 and 53 are additional innertubes of shapes resembling blunt cones whose bases have been replaced by segments of spheres or related rounded bodies.

The six divisional innertubes are assembled within the cavity of the left rear protector 34 to form a unit or innertube aggregate, having a common air inlet, 54, Figure 6, leading to a central inflating and pressure indicating station, not shown, and they are all connected together by air passages such as 55, 56 and 57. Inflating air pressed into the air duct 54 will inflate the six cavities 48—53 simultaneously.

The innertube aggregate is composed of units of such size and of such form, within the rules explained below, as to fill out the casing cavity as completely as possible. As illustrated in Figure 7, of the hollow spaces left between casing part 58 and the innertubes 50—53, only the dead corner spaces where the enclosure changes direction, are necessarily filled out by a flexible inlay such as the inlay 59 and 60. The inlay 61 filling out the dead space between the bladder 53 and the rigid bracket 35 is optional and required only if the surfaces of the bladder 53 do not actually contact the bracket as a counter support.

Each innertube unit is constructed of a flexible but non-elastic, little yielding material only, such as, for instance of rubber and cotton fibers or of loaded and well vulcanized rubber similar, for example, to the rubber used in rubber heels of shoes; each of the composing units 38—53 is further constructed of a shape which on inflation will preserve the form of the pattern or design according to which has been constructed and will not bulge or balloon, of which an inelastic hollow sphere or parabaloid or ring are examples; the aggregate is inflated by a common inlet and all cavities are connected by air passages; it is of such size as to fit into the cavity formed by casing and metal parts snugly but without restricting compression, the outside of the innertube aggregate to be made of the same form and dimensions as the inside of the casing cavity; and the innertube aggregate is to contact at least the inner corners of the casing, aided by flexible inlays or additions, if necessary.

It is part of my invention to fill out more or less all the dead spaces by the means shown in Figures 3-5. In Figure 3, the casing part 62 encloses the two curved tubes 48 and 49. The window of the casing is secured to the frame or body 21 of the car, holds the other bead 66 of the casing window by the screw 67. The casing 62 is provided in its inner surface with extending folds, prominences and enlargements so as to surround the innertubes 48 and 49 without dead space. 68 and 69 are optional decorative additions to the surface of the casing and are not shown in the other figures.

In Figure 4, 70 is the body of the car, to which a bracket 71, corresponding in purpose to the bracket 36 of Figure 4, is fastened by the screw 72. In the modification illustrated here, the innertube aggregate has been fused with the casing and the pneumatic fender, therefore, consists of a solid, fender shaped, elastic body 74 inflated through a common inlet 75 by the contained cavities 76 and 77 shaped as the innertubes shown in Figures 2, 6 and 7 and connected by communicating air passages such as 78. The fender is fastened to the car and brackets by the nuts 79 and 80 taking hold of screws extending from the imbedded beads 81 and 82. The external shape of the fender, the cavities, and the suspension correspond in the other parts to the details shown in the other figures with the exception of the fusion between innertube aggregate and casing, transforming in effect and for manufacturing purposes the whole fender into one unit containing cavities and metallic beads for attachment to the car.

In Figure 5, 83 is the frame or body of the car and 84 the bracket corresponding to the arch 36 of Figures 1, 2 and 3 in location and function, although modified in form. It is fastened to the body 83 by the screw and nut 85. 86 represents the casing of the fender, held by the flat metal rods 87 and 88 pressed against the body 83 respectively 89 and 84, holding the casing firmly in its place. Within the casing 86, two curved innertubes 91 and 92 such as shown in Figure 2 and Figure 6 are located which communicate among themselves and are connected by air passages with the other 4 tubes of the innertube aggregate, to be inflated by a common inlet. In the modification illustrated in Figure 5, the dead spaces of the casing are filled by optional flexible but non-inflatable and non-compressible inlays 93 and 94 forming a part of the innertube aggregate or being independent.

All non-deforming pneumatic bodies, such as I prefer to use them for the assembly of the innertube aggregate of my protectors, must comply with the test requirement that each unit will not balloon or bulge and not change its form as compared with the form of the pattern, design or mold according to which it was constructed, when inflated by a pressure which is sufficient to expand the flexible, inelastic material, from which the body is made, but is below the breaking point of the material. It will be found that most forms meeting this test, are composed of a plurality of circles, having a continuous increase, possibly an even level, and a decrease in diameter; the axis of the circles is generally arranged likewise as the axis of the body and the circles are arranged in the same plane as the expansion would tend to deform the body.

The Figures 8, 9, 11 and 12 illustrate in different view the construction of the right front fender or protector 20 of Figure 1, and its innertube. The structure of the casing and the suspension of the same corresponds principally to the details described for the rear fender in the Figures 2, 3, 6 and 7.

In Figure 8, 20 is the protector, which is attached to the body 21 of the car and to the arch 30 directly and by the brackets, substantially as indicated in Figure 1, and similarly as described for the rear fender. The nuts such as 95 represent some of the connecting structures.

In Figure 9, the arch 28 is seen, to which the casing is fastened by screws such as 96. 97 is the axle of the wheel 22 which has been removed. The casing is held by the screws 98 and 99 to the brackets 26 and 27.

In Figure 11, the bracket 26 is secured by the screw 100 to the body or frame 21, and the screws 96 and 101 are holding the casing edge with the aid of the flat rods 102 and 103. The casing has a bead 104, providing angular and straight surfaces to the casing.

In Figure 12 the assembly of the bracket 27 to the arch 36, protecting the radiator, is represented by the screw 105. The casing is held to these rigid structures continuing its cavity, by the screws 106 and 107.

The innertube for the protector 20, illustrated in various views in the Figures 8, 9, 11, and 12, represents a modification of the principle explained before, without limiting, however, any of the constructions to the use with either protector.

The Figures 8, 9 and 11 illustrate how the back portion of the protector is inflated by the four curved tubes 108, 109, 110 and 111 which are provided with communicating air passages such as 112 and are connected with the group of front subdivisions by the air passage 113 and with a central pressure indicating and inflating station by the inlet 114. The four divisional tubes 108—111 are also made from flexible non-yielding material such as rubber and fibers or well vulcanized and filled rubber such as found in cheaper rubber goods. They are assembled and preferably united into one unit showing single septums, as seen in Figure 11, and of such size, that, when made, the outside of the aggregate fits snugly but without undue space or compression into the inside of casing.

Each of the divisional units 108—111, can be considered as consisting of a non-deforming tube similar to the units 48 and 49, described before, distinguished by the removal of one segment each from tube 108 and 111, respectively two segments each from 109 and 110, permitting to join the units into an aggregate which will not bulge or balloon on inflation, and has a more level surface with less dead space. The small dead spaces such as 112 and 113, may be filled as described in the Figures 3 and 4, or the casing may be dispensed with, as illustrated in Figure 5. As indicated in the figures, the cross section of each of the units 108—111, represents a part of a circle and each is closed on both ends by a segment of a sphere.

The construction of the anterior part of the right front protector is shown in Figures 8, 9 and 12, as composed of 7 cavities, 114—120. The dead spaces between the front poles of the tubes 108—111 and the last cavity 120 is filled by flexible inlays such as 121 and 122. All cavities are connected by air passages, such as 123. Of the sub-units, 115—120, each has two flat inner surfaces, of which always the two adjoining, such as for example the anterior surface of 120 and the posterior of 119 are of equal shape and size, and they are preferably fused into one septum 124, as shown in Figure 8. The outer surfaces of each cavity are rounded preferably into the form of tubular or spherical segments; the curvature and the depth of the dead space depending upon the width, the arrangement and outline of the sectors, as indicated in Figure 8. The first link, 114, has one flat and one curved surface, which is supplemented by the inlay 125.

In a vertical section, as shown in Figure 12, the units do not represent necessarily rounded outlines as seen from the section of the cavity 120 and also from the projection of the juncture 126 between the unit 120 and 119, indicated in interrupted lines.

I have found that the approximation to a non-deforming body, produced by rounding the outer surfaces, as described and illustrated, in connection with the bracing against ballooning afforded by the deep septums and by the rigid metal extension of the casing as described before, will sufficiently mitigate and prevent deformation of the casing when the innertube is inflated, provided that the material from which the innertube complex is made is relatively inextensible and will not yield on the pressure used except in such extent as to supply tension to the casing.

In Figure 10, the preferred construction of the wall of the casing and of the assembly of the window and bead of the casing to the metallic supporting structures are illustrated. 127 represents the body of the car or a metallic support provided with a hole 128. The edge of the flexible casing 129 is looped around a flat metal rod 130 which is preferably vulcanized to the casing, forming an integral part of the bead, and contacts the inside of the casing in a firm union, firmly surrounding and enclosing the bead 130, which itself is drawn by the screw 131, forming preferably a part of the metal rod 139, and the nut 132 firmly against the metallic wall 127, effecting a strong, but easily detachable union between casing and the metallic structures. The attachment illustrated in Figure 10, can be modified by omitting the full loop around the metal rod and merely holding the edge of the casing by pressing it between a flat metal rod, and the supporting metal structures by means of screws held in place by friction of holes in the edge of the casing, through which the screws are conducted, or by welding them to the rod, to facilitate assembly. This modification is illustrated in Figures 5, 11 and 12. I also employ beads which contain metal rods vulcanized in, as shown, for instance in Figures 3 and 4, and attach the fender by screws taking hold of these metal inserts.

For protection against sharp forces, for strength and absence of bulk, I prefer to include wire such as piano steel wire or steel wire cable or others into the structure of my protector. In Figure 10, 133 represents a wire enforcement which has been made part of the casing structure and 134 represents cross sections of similar wires forming, together with other wires of the direction the wire 133 has, a wire cloth, enforcing the casing, and greatly increasing the strength of the assembly of the casing to the metallic structures, since, as illustrated in Figure 10, part of the wires extend around the bead and are held firmly between bead and metallic body.

The protectors should be inflated by a pressure sufficient to transform them into firm, resilient, well shaped bodies, capable of affording protection to the car in accidents. Generally a pressure in approximation used to the pressure in tires is practical, and I find that I prefer to inflate the innertubes such that the casing is taut or under strain while the innerbladders are fully expanded. The inflating is best done from a central station, inflating all or a plurality of the protectors simultaneously, checking also the pressure by an indicating device. Each line leading to a protector is preferably provided with a shutoff valve to facilitate discovery of leakage in one protector. When travelling at high speed the valves may be closed to increase the resistance of the protectors, each acting singly, while the protectors will act somewhat softer when the connecting lines with open transmitting valves connect all four protectors. The size of the air passages within the innertube aggregates also regulates the degree of resiliency.

My construction of the innertube aggregate has, outside of the prevention of ballooning, the great advantage, as to strengthen the protector and to reduce greatly the danger of bursting since each of the septums acts as a beam holding the two opposing surfaces together, reducing at the same time, the inner size of the protector cavity by the smaller subdivisions, able to bear greater inflating pressure, since the strength of the wall against a load increases with reduction of its surface. The added construction of using wires, or wire cables within the structure of the casing, permits to employ high pressures in the protectors, required or preferred for some purposes as for instance for the protectors used in buses, trucks or other heavy vehicles.

The construction of the innertube aggregate can be modified in numerous forms, using as a basic requirement inextensible material for the innertube and at least one septum directed to the line most likely to balloon.

While I have disclosed what I now consider to be some preferred embodiments of the invention in such manner that they may be readily understood, it is manifest that changes may be made in the details disclosed without departing from the spirit of the invention as expressed in the claims.

I claim:

1. A non-symmetrical pneumatic fender for automobiles comprising an outer casing, and a plurality of inflated inner members substantially filling the outer casing and as an aggregate, maintaining the outer casing in its desired non-symmetrical shape substantially without bulging, said inner members being hollow and formed of flexible, substantially inextensible material, said inner members being arranged in close proximity to each other and having outer portions bearing against the casing, said outer portions of the inner members having contours corresponding to a portion of a symmetrical geometrical surface of revolution, whereby bulging of the non-symmetrical casing is prevented.

2. A non-symmetrical pneumatic fender for automobiles comprising an outer casing, and a plurality of inflated inner members substantially filling the outer casing and as an aggregate, maintaining the outer casing in its desired non-symmetrical shape substantially without bulging, said inner members being hollow and formed of flexible, substantially inextensible material, said hollow inner members being connected by air passages, said inner members being arranged in close proximity to each other and having outer portions bearing against the casing, said outer portions of the inner members having contours corresponding to a portion of a symmetrical geometrical surface of revolution, whereby bulging of the non-symmetrical casing is prevented.

3. A non-symmetrical pneumatic fender for automobiles comprising an outer casing, and a plurality of inflated inner members substantially filling the outer casing and as an aggregate, maintaining the outer casing in its desired non-symmetrical shape substantially without bulging, said inner members being hollow and formed of flexible, substantially inextensible material, said inner members being arranged in an orderly sequence with their adjacent portions flattened and having outer portions bearing against the casing, said outer portions of the inner members having contours corresponding to a portion of a symmetrical geometrical surface of revolution, whereby bulging of the non-symmetrical casing is prevented.

CLAUSS BURKART STRAUCH.